W. LAKSO.
SLEIGH RUNNER FOR MOTOR CYCLES.
APPLICATION FILED NOV. 2, 1916.

1,217,191. Patented Feb. 27, 1917.

Witnesses
Fenton S. Belt
J. W. Sherwood

Inventor
Walentin Lakso
By Frank H. Hough
Attorney

UNITED STATES PATENT OFFICE.

WALENTIN LAKSO, OF CHESTER DEPOT, VERMONT.

SLEIGH-RUNNER FOR MOTOR-CYCLES.

1,217,191.

Specification of Letters Patent.  Patented Feb. 27, 1917.

Application filed November 2, 1916.  Serial No. 129,142.

*To all whom it may concern:*

Be it known that I, WALENTIN LAKSO, a subject of the Czar of Russia, residing at Chester Depot, in the county of Windsor and State of Vermont, have invented certain new and useful Improvements in Sleigh-Runners for Motor-Cycles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sleigh runners for motor-cycles and consists of a simple and efficient device of this nature which may be easily and readily applied to motorcycles, adapting the same for use upon ice or snow.

The invention consists of a simple device of this nature having various details of construction, combinations and arrangements of parts which will be hereinafter fully described, shown in the accompanying drawings and then specifically defined in the appended claims.

I illustrate my invention in the accompanying drawings, in which:—

Figure 1:
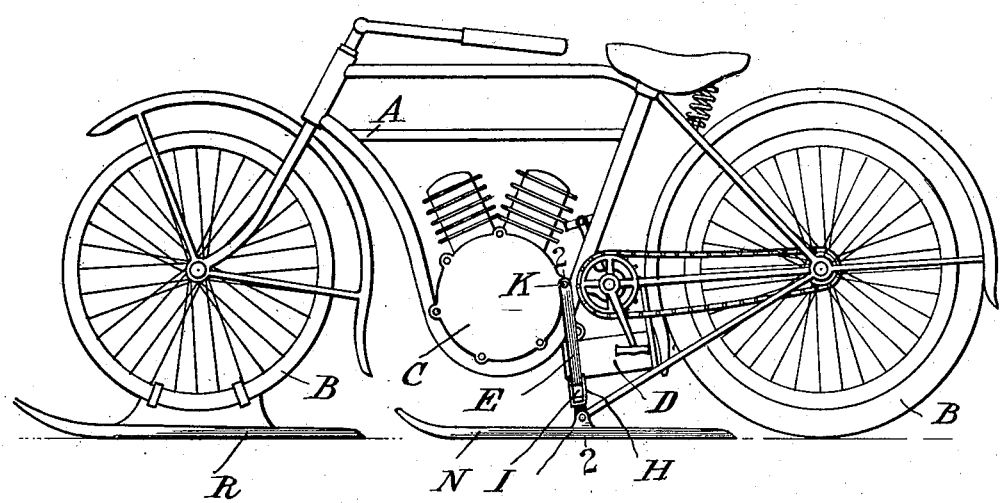
Figure 1 is a side elevation showing the application of my invention to the motor-cycle.
Figure 2:
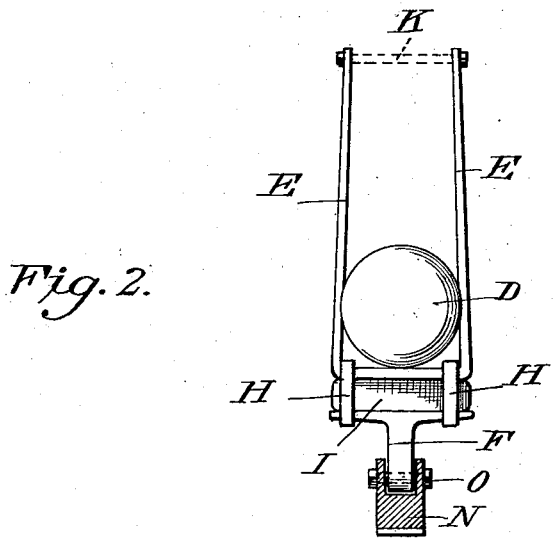
Fig. 2 is a sectional view on line 2—2 of Fig. 1.

Reference now being had to the details of the drawings by letter, A designates the frame of a motorcycle having wheels B, and C is the motor having a muffler D. A clevis-shaped yoke, designated by letter E, is held to a T-shaped supporting member F by means of the fastening devices H, and intermediate said yoke and member E and F is a cushion I adapted to take up vibration. Said muffler passes through the member E and the latter is held to the motor casing through the medium of the rod K. The runner and motor part of the cycle is designated by letter N and which is fastened to the shank portion of the member F in any suitable manner, as by means of a pivotal pin O. A runner R, of any suitable construction, is placed underneath the forward wheel and secured thereto in any suitable manner.

By the provision of a runner attachment made in accordance with my invention, the same may be easily and quickly applied to motorcycles, adapting the same for use over slippery roads or upon ice and snow. As the rear driving wheel of the motorcycle comes in contact with the surface over which the machine is driven, the same may be provided with a covering of armor plate material or spur means whereby the wheel may frictionally engage the surface over which the machine is to be driven.

What I claim to be new is:—

1. Sleigh runners for motorcycles comprising, in combination with the motor casing, a yoke fastened thereto, a runner, and a member to which the same is pivoted, said member being fastened to the yoke, and a cushion intermediate the latter and said member.

2. Sleigh runners for motorcycles comprising, in combination with the motor casing, a clevis-shaped yoke having arms which are apertured, a rod passing through said arms and motor casing, a T-shaped member, and a runner to which the same is pivoted, a cushion intermediate said member and yoke, and links connecting said yoke and member.

In testimony whereof I hereunto affix my signature in presence of two witnesses.

WALENTIN LAKSO.

Witnesses:
 HUGH HENRY,
 HUGH H. HENRY.

Copies of this patent may be obtained for five cents each, by addressing the "Commissioner of Patents, Washington, D. C."